(No Model.) 2 Sheets—Sheet 1.

T. W. GREENE.
HORSE HAY RAKE.

No. 377,103. Patented Jan. 31, 1888.

Attest:
John Schuman.

Inventor:
Thomas W. Greene.
By his Att'y
Thos. L. Sprague.

(No Model.)
2 Sheets—Sheet 2.

T. W. GREENE.
HORSE HAY RAKE.

No. 377,103. Patented Jan. 31, 1888.

Witnesses:
P. M. Hulbert

Inventor:
Thos. W. Greene
By J. J. H. Robertson
Att'y.

UNITED STATES PATENT OFFICE.

THOMAS W. GREENE, OF LANSING, MICHIGAN.

HORSE HAY-RAKE.

SPECIFICATION forming part of Letters Patent No. 377,103, dated January 31, 1888.

Application filed February 3, 1887. Serial No. 226,366. (No model.)

*To all whom it may concern:*

Figure 1:
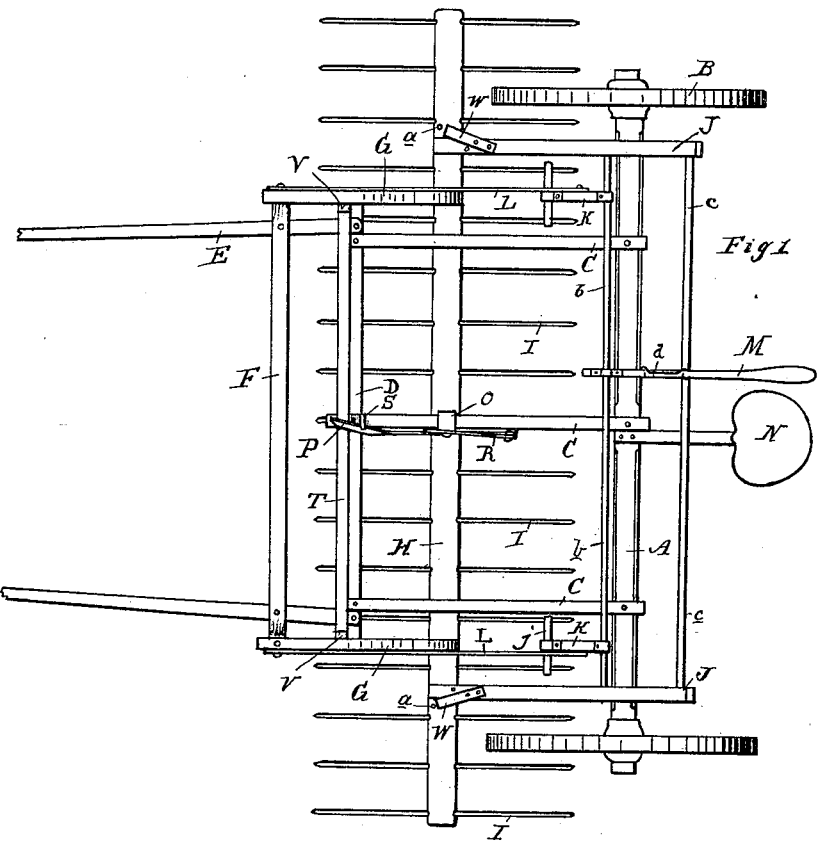
Figure 2:
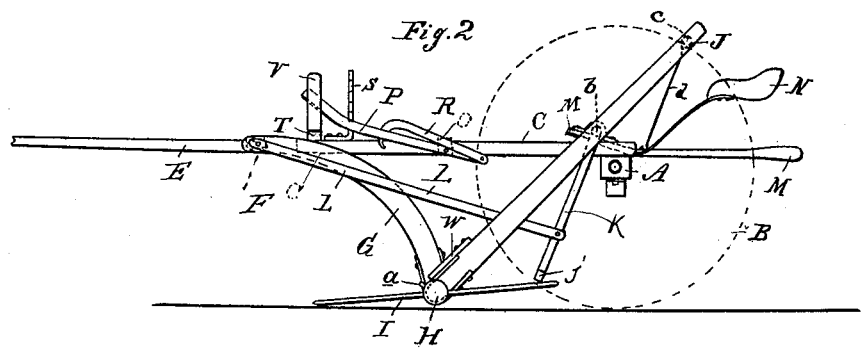
Figure 3:
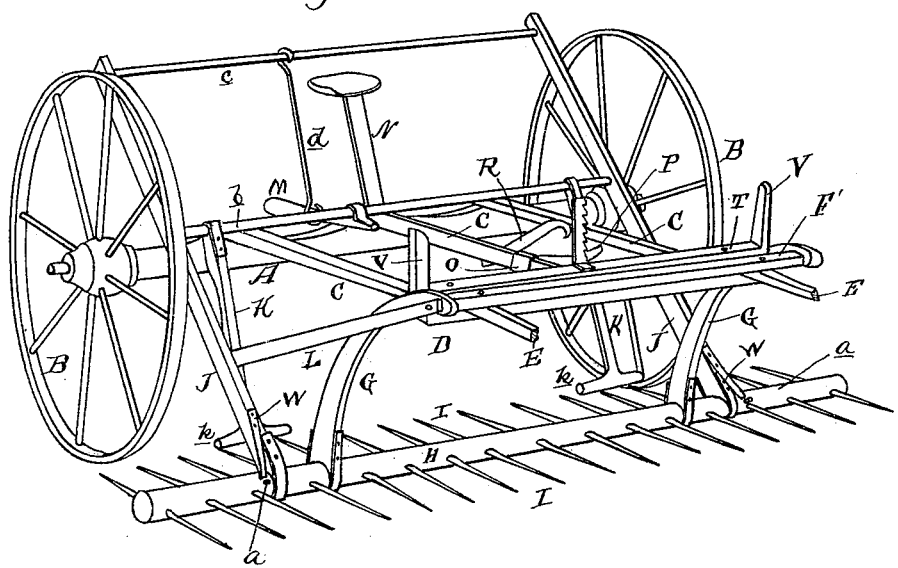

Be it known that I, THOMAS W. GREENE, of Lansing, in the county of Ingham and State of Michigan, have invented new and useful Improvements in Horse Hay-Rakes; and I do hereby declare that the following is a full, clear, and exact description thereof, reference being had to the accompanying drawings, which form a part of this specification.
This invention relates to certain new and useful improvements in horse hay-rakes; and the invention consists in the peculiar construction, arrangement, and combination of parts, all as more fully hereinafter set forth.
Figure 1 is a top plan of my improved horse hay-rake. Fig. 2 is a side elevation with the wheels shown in dotted outline. Fig. 3 is a perspective view.

In the accompanying drawings, which form a part of this specification, A represents the axle which carries the traction-wheels B.

C are parallel bars, the rear ends of which are rigidly secured to the axle, while their forward ends are secured to the cross-bar D, to which latter the thills E are rigidly secured. The cross-bar F of the thills, and to which the draft is applied in the usual manner, projects at each end somewhat beyond the sides of the thills, as shown.
G are curved draft rods or bars, which are pivotally secured by means of bolts to the ends of the cross-bar F of the thills, the lower ends of such draft-rods being pivotally secured by proper straps to the rake-head H (which latter carries the rake-teeth I) in any manner that will permit the rake-head to turn in discharging or dumping a load. To the rake-head are also similarly attached the side bars, J, of the tilting frame, which latter consists of said side bars, J, the rear ends of which are connected together by the girts or rods $b\ c$. To the lower ends of the side bars, J, are secured spring plates or dogs W, which are designed, in the operation of the device, to engage with pins $a$, projecting from the rake-head, and are for the purpose of preventing the rake-head from making a retrograde movement or turning in the wrong direction.

Hanging from the rod $b$ of the tilting frame, and near each end thereof, are stops K, the free ends of which are provided with cross-heads $k$, and which rest upon the rearwardly-projecting teeth of the rake to prevent the rake from tripping, as hereinafter described. Bars L connect these stops K with the outer ends of the draft-rods G, said bars L being pivotally connected at each end.

M is a handle, the lower end of which is pivotally hung upon the cross rod $b$ of the tilting frame, while its outer end is supported by means of a rod, $d$, pendent from the upper rod, $c$, of the tilting frame, as shown. This handle is so placed as to be within easy reach of the driver when seated upon the seat N, which latter may be centrally located or near one end of the machine, as may be desired. When the tilting frame is in its lowered position, the cross bars or rods $b$ rest upon the parallel bars C. From this construction it will be observed that as the tilting frame is raised radially by means of the handle M the stops K and bars L are radially raised with it. This necessarily compels the lower ends of the stops K to pass toward the rear of the machine and out of the path of the rake-teeth. When the latter are turning to discharge a load, the forward ends of the rake-teeth are at the same time slightly depressed, so as to catch in the ground. This depressing of the rake-teeth is caused by the ends of the dogs W coming in contact with the pins $a$ of the rake-head as the tilting frame is raised, and thereby imparts to the rake-head its initial movement in the rotation that immediately follows as the machine is drawn forward.

O is a saddle designed to rest and slide upon the center parallel bar, C, and has pivotally secured to it the lever P, to the short arm of which is likewise pivotally secured the hook R. When it is desired to raise the rake-head from the ground, as in driving to or from the field, the saddle O is slipped over the center bar, C, of the frame, and the hook R is dropped down so that it may be hooked upon the rake-head. The longer arm of the lever is now depressed until it will engage with the rack-bar S, rising from the frame of the machine, and has raised the rake-head the desired distance from the ground.

T is a supplemental bar which is secured across the ends of the parallel bars C and the rear ends of the thills, above the bar D, and to its outwardly-projecting ends standards V are secured, which prevent the draft-rods G from catching upon the ends of the cross-bar D of the frame as the bars G radially move in the operation of the machine.

What I claim as new is—

1. The combination of the rake-head H, the thills, cross-bar F, connecting said thills, the curved draft-bars G, pivotally connecting said bar and rake-head, the tilting frame J, stops K, hanging from said tilting frame, and the bars L, pivotally connecting said stops and bars G with the supplemental bar T, guide-standards V, and handle M, substantially as and for the purpose described.

2. In a horse hay-rake, the combination of the axle A, wheels B, bars C, cross-bar D, thills E, cross-bar F, connecting the thills in advance of the bar D, the curved draft-rods G, pivotally connecting the bar F and rake-head H, teeth I, tilting frame J, stops K, bars L, handle M, sliding saddle O, lever P, hook R, ratchet-bar S, supplemental bar T, standard-guides U, dogs W, and pins $a$, the parts being constructed, arranged, and operating substantially in the manner and for the purposes specified.

THOMAS W. GREENE.

Witnesses:
H. S. SPRAGUE,
E. SCULLY.